United States Patent Office 3,526,826
Patented Sept. 1, 1970

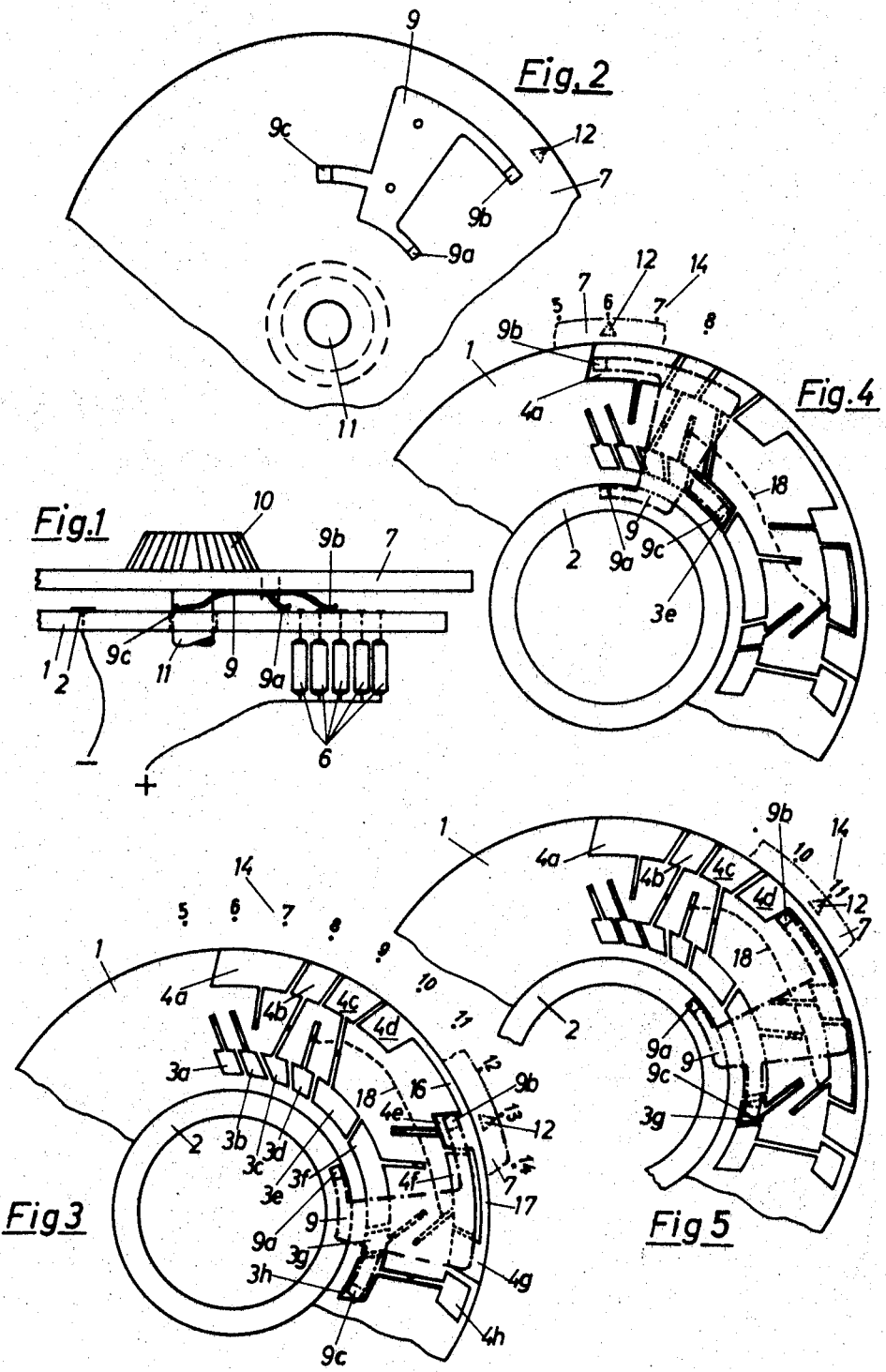

3,526,826
EXPOSURE CONTROL INSTRUMENT FOR PHOTOGRAPHIC CAMERAS
Dieter Rittmann, Calmbach, Black Forest, Germany, assignor to Prontor-Werk Alfred Gauthier G.m.b.H., Calmbach, Black Forest, Germany, a corporation of Germany
Filed June 23, 1967, Ser. No. 648,471
Claims priority, application Germany, June 24, 1966, P 39,785
Int. Cl. G05f 5/00; H02m 3/06
U.S. Cl. 323—80          10 Claims

ABSTRACT OF THE DISCLOSURE

An instrument for entering exposure factors such as aperture and/or film sensitivity values into the electronic timing device of a photographic camera. The instrument has several capacitors of different capacity which are individually electrically connected to contact plates and are includable in the circuit of the timing device by a contact bridge and a slide path cooperating with the contact bridge. The contact bridge is movable by a setter and the contact plates are arranged so that capacitors individually or in various combination with other capacitors are includable in parallel in a circuit of the timing device by means of the contact bridge.

---

This invention relates to an instrument for entering exposure factors such as aperture and/or film sensitivity values into the electronic timing device of a photographic camera. The instrument of this invention is equipped with several capacitors of different capacity which are individually connected electrically to contact plates and are includable into the circuit of the timing device by means of a contact bridge movable by a setter and by a slide path coordinated with the latter.

Previous instruments of the above type have provided for, in conjunction with a photo-resistor attachable to the instrument, the taking of pictures with automatic exposure time control as a function of lighting conditions with a camera in which the exposure time is otherwise presettable by hand only. In such instruments the expenditure for capacitors is disproportionately large in that the capacity values to be entered into the electronic system of the camera cannot each be formed by a single capacitor. The reason is that commercial capacitors are available only in standardized series whose capacity values do not coincide with the capacity values which, for the consideration of the exposure factors such as aperture and, if applicable, film sensitivity, must be entered into the electronic system of the camera. In order to provide for the formation of the desired capacity values, two capacitors have been interconnected by soldering for each capacity value whereby several capacitors of the same capacity were contained in various combinations, thereby necessitating the use of an undesirably high number of capacitors.

It is an object of this invention to provide for entering a certain number of exposure factors into the circuit of the electronic timing device of the camera with the least possible number of capacitors.

It has now been found that the foregoing object and other advantages can be readily attained in an instrument for entering exposure factors into a photographic camera equipped with an electronic timing device by designing and coordinating the contact plates so that capacitors singly or in various combinations can be paralleled to various other capacitors and included in the circuit of the timing device by means of a contact bridge. This design of an instrument of the type mentioned at the outset is extremely advantageous as it not only avoids unnecessary costs, but also makes it possible, in addition, to achieve considerable savings in space requirements as well as a reduction in the weight of the arrangement. The reason being that the connection of two capacitors is not fixed right from the start, but is rather formed only when setting the exposure factor by means of the contact bridge. In this way the same capacitor can be utilized for the formation of various capacity values.

One embodiment of this invention which meets the practical requirements of setting the exposure factors simply and clearly is achievable according to another feature by designing and coordinating the contact plates so that a constant series of capacity values is formed by the capacitors which are tuned to the aperture values and, if applicable, to the film sensitivity values.

As to the design of the instrument in detail, it is further provided according to the invention, for the prupose of achieving a simple and clear configuration, that the contact plates be disposed on two equidistant tracks and that the contact bridge be provided with a total of three contact arms, one for scanning a slide path and the other two for scanning the contact plates.

One simple embodiment of this invention for restricting the number of capacitors to a minimum can be realized according to another advantageous feature of the invention by including the same capacitor in the circuit of the timing device by means of one or by two arms of the contact bridge in various positions of the setter. To achieve this, one side of the capacitors which can be paralleled are connected to two contact plates, one of the contact plates being in one of the plate tracks and the second contact plate being in the other plate track. Another provision of this invention, which in conjunction with the above mentioned measure allows for the use of a particularly small number of capacitors, consists in having the capacitors directly soldered to the contact plates assigned to them and in having the contact plates which are remote from each other connected to one capacitor each by means of a wire or the like.

To achieve an uncomplicated arrangement of the contact plates on the chassis plate of the instrument, it is further provided according to the invention that when the two tracks of the contact plates are concentrically arranged, the contact arms of the contact bridge assigned to these tracks are disposed so as to be offset by an angle which assures as short as possible a connection between the contact plates located on one track and the capacitor assigned to them.

Other objects and advantages will be readily apparent from the following detailed description and the attached drawings wherein:

FIG. 1 is a partial side view of an instrument for entering exposure factors into the circuit of an electronic timing device of a camera.

FIG. 2 is a partial top view of the setting member of the instrument of FIG. 1 carrying the contact bridge.

FIG. 3 is a partial top view of the chassis plate of the instrument of FIG. 1 provided with contact plates and a slide path, with the contact bridge illustrated in phantom line.

FIGS. 4 and 5 are views similar to FIG. 3 with the contact bridge illustrated in various settings by phantom line.

Referring now to the drawing, there is illustrated a disk shaped chassis plate designated by the reference numeral 1, having assembled thereto a concentric slide path 2. The chassis plate 1 is provided with a number of contact plates 3a–3h and 4a–4h each being connected to a capacitor 6. The plate 1 can be of printed circuit design, whereby the slide path as well as the contact plates 3a–3h and 4a–4h are made up of a metallic material that is printed on the electrically nonconductive plate 1.

The chassis plate 1 forms part of an instrument which is attachable to a photographic camera equipped with an electronic timing device. In such cameras, the instrument makes it possible, in conjunction with a photo-resistor connectable to it, to control the exposure time automatically as a function of the prevailing lighting conditions. This is accomplished by switching off the resistance-capacitance members of the time control device of the camera and including both the photo-resistor and one of the capacitors 6 in the circuit of the electronic timing device.

To enter the respective capacity value into the timing device, a contact bridge 9 is provided that is movable by means of a setter 7. The setter 7 is equipped with a knob 10 and is disposed on a shaft 11 which serves to guide the setter 7 in the housing of the instrument. In addition, the setter 7 has a mark 12 to which a fixed exposure factor scale 14 is coordinated. The exposure factors may be the usual aperture or film sensitivity values. However, the scale 14 can also contain both types of factors, namely the aperture values in one part and the film sensitivity values in an adjacent part. In the latter case, the knob 10 co-rotates with the shaft 11 and is movable relative to the setter 7, and is provided with a setting mark. The contact bridge 9 co-rotates with the shaft 11 so that the setting motions of the knob 10 and the setter 7 are superimposed on each other. The arrangement can also be such that the exposure factor scale 14 containing the aperture and film sensitivity values are plotted on the setter 7, and the mark 12 is disposed on the instrument housing and the second mark is again on the knob 10.

As is known, commercial capacitors are standardized in series and have capacity values which coincide only in part with those required for entering the exposure factors into the electronic time control circuit. To form the desired capacity value which corresponds to the respective exposure factor, capacitors may be combined with each other. In order to restrict to a minimum the numerical requirements for the capacitors 6 for the entire setting range of the exposure factor scale 14 in simple manner, the design and coordination of the contact plates 3a–3h and 4a–4h are such that, by means of the contact bridge 9, the capacitors singly or in combinations with another capacitor can be included in the circuit of the timing device.

Furthermore, the arrangement of the contact plates 3a–3h and 4a–4h as well as the capacitors 6 connected with them can be such that a constant series of capacity values is formed, corresponding with the exposure factor scale 14. For this purpose, the contact plates 3a–3h and 4a–4h are disposed, as may be seen from FIGS. 3 to 5, on two tracks concentric with the slide path 2. The contact bridge 9 is provided with three arms 9a, 9b and 9c, of which the arm 9a constantly engages the slide path 2, while the contact plates 3a–3h and 4a–4h can be scanned by means of the other two arms 9b and 9c.

To form capacity values corresponding to the values of the exposure factor scale 14, one of the capacitors 6 can be combined with one additional capacitor in various settings of the setter 7. This can be accomplished by having the contact plate assigned to the respective capacitor, for instance the plate 4a, extend over two or more settings of the setter 7. Another capacitor can be combined several times by connection to two contact plates, for instance with the contact plates 3e and 4c, each of which is located on one of the plate tracks. In addition, the contact plate 3e can extend over two settings so that the capacitor 6 connected to the plates 3e and 4c can be tapped a total of three times, once by means of the contact arm 9b and, in two other settings, by means of the contact arm 9c. Accordingly, this capacitor 6 can be combined each time with a capacitor of a different capacity.

The capacitor 6 connected to the contact plates 4d, 4e and 4g can likewise be tapped in three settings by means of the contact arm 9b. However, these three settings do not follow each other in direct succession as is the case with the contact plate 3f, rather, each time there are two steps in between in which no capacitor or a capacitor of different capacity is added to the circuit via the contact arm 9b. The plates 4d and 4g are connected to the contact plate 4e by narrow cross bars 16 or 17, respectively, which may be wire or the like. The contact plate 4e is connected directly to the respective capacitor 6. The cross bars 16 and 17 are outside of the range of motion of the contact arm 9b.

Another possbility for including the same capacitor in the circuit of the timing device in various positions of the setter 7 thereby reducing the number of capacitors, consists in connecting remote contact plates to a single capacitor through a wire between the contact plates. For instance, in order to save one capacitor, as the same capacity value is required at the plate 3d as at the contact plate 4f, to which the respective capacitor 6 is soldered directly, the contact plate 4f is connected to the remote contact plate 3d via a wire 18 running along the underside of the chassis plate 1. Thus, only a single capacitor is required for both the plates 3d and 4f.

As is further evident from the drawing, the contact points of the two arms 9b and 9c are offset with respect to each other by an angle of about 50°. This arrangement makes it possible to connect, via the shortest possible route, those contact plates which, on one hand, are connected to the same capacitor 6 but, on the other, are located on different tracks, as is the case for example with plates 3c and 4b or 3e and 4c.

To enter an exposure factor into the circuit of the electronic timing device such as an aperture and/or a film sensitivity value, the setter 7 and, if applicable, the knob 10 which is movable relative to the setter 7, is brought into the desired setting. The contact bridge 9 may thereby assume, for example, the position shown in FIG. 3 in which the contact arm 9b taps contact plate 4e while the contact arm 9c rests against the plate 3h. The capacity value corresponding to setting value "13" is formed, therefore, by the capacitors 6 which are connected to plates 4e and 3h and are in parallel due to the contact bridge 9. If the value "6" is desired, for example, then the contact bridge 9 is brought into the position shown in FIG. 4. The capacity value assigned to this setting is then obtained by paralleling the capaciors 6 connected to the plates 4a and 3e by means of the contact bridge 9. In the "5" setting, in contrast, only the capacitor 6 connected to the plate 3e is included in the circuit because the contact arm 9b has left the plate 4a in this setting. The situation is similar when setting the "11" value as illustrated in FIG. 5 because there the contact arm 9c taps plate 3g, while the contact arm 9b does not engage any contact plate. When setting the value "10," the respective capacity value is formed by tapping the contact plates 4d and 3f.

Only a portion of the chassis plate 1 and contact plates 3a–3h and 4a–4h is shown in the disclosed embodiment for clarity of illustration. In practice, the two plate series can be continued, and the capacitors can be combined in the manner described over the entire extent of the chassis plate so that it is possible to achieve a relatively large setting range with a relatively small number of capacitors.

It will be understood that the foregoing description with the details of exemplary structure is not to be construed in any way to limit the invention, but that modification may be made thereto without departing from the scope of the invention as set forth.

Having thus described my invention, I claim:

1. An instrument for entering exposure factors such as aperture and film sensitivity values into the electronic timing device of a photographic camera comprising several capacitors of different capacity which are individually electrically connected to contact plates and are includable in the circuit of the circuit of the timing device by a contact bridge and by a slide path cooperating with said contact bridge, said contact bridge being movable by a setter, said contact plates being arranged so that said capacitors individually or in various combinations with other of said capacitors are includable in parallel in the circuit of said timing device by means of said contact bridge and wherein said contact plates are arranged with said capacitors to form a constant series of capacity values corresponding to the exposure factors and wherein said contact plates are disposed on two tracks and wherein said contact bridge is provided with three contact arms, one of said contact arms scanning said slide path and the other two of said contact arms scanning said contact plates.

2. The instrument of claim 1 wherein one of said capacitors is includable in the circuit of the timing device by one of said arms of said contact bridge in certain settings of said setter or by two of said arms of said contact bridge in other settings of said setter.

3. The instrument of claim 2 wherein one side of said capacitors that can be paralleled is connected to two of said contact plates, each one of said two contact plates being disposed on different tracks.

4. The instrument of claim 2 wherein capacitors are directly connected to contact plates assigned to them, and wherein contact plates remote from said capacitors are each connected to one of said capacitors by means of a wire.

5. The instrument of claim 3 wherein said two tracks of said contact plates are arranged concentrically, and wherein said contact arms of said contact bridge assigned to said contact plates forming said tracks are arranged so as to be offset by an angle providing as short a connection as possible between said contact plates located on different tracks and said capacitor assigned to said contact plates.

6. An instrument for entering exposure factors such as aperture and film sensitivity values into the electronic timing device of a photographic camera comprising means for connecting said instrument to the electronic timing device of a photographic camera, a plurality of capacitors of different capacity, a plurality of contact plates having capacitors individually electrically connected thereto, said capacitors being includable in the circuit of the timing device by an adjustable contact bridge and by a slide path cooperating with said contact bridge, said contact plates being disposed on said instrument so that by means of said contact bridge capacitors individually or in various combinations with other of said capacitors are includable in parallel in the circuit of the timing device, and wherein said contact plates are connected with said capacitors to form a series of capacity values corresponding to exposure factors, and wherein said contact plates are disposed on a plurality of spaced tracks and wherein said contact bridge is provided with a plurality of contact arms, one of said contact arms scanning said slide path and other of said contact arms scanning said contact plates disposed on said tracks, and wherein said contact bridge is adjustable by means of a setter.

7. The instrument of claim 6 wherein one of said capacitors is includable in the circuit of the timing device by one of said arms of said contact bridge in certain settings of said setter or by two of said arms of said contact bridge in other settings of said setter.

8. The instrument of claim 7 wherein one side of capacitors that can be paralleled is connected to two of said contact plates, said two contact plates being disposed on different tracks.

9. The instrument of claim 7 wherein said capacitors are directly connected to contact plates assigned to them, and wherein contact plates remote from said capacitors are each connected to one of said capacitors by conductive means.

10. The instrument of claim 8 wherein said two tracks of said contact plates are arranged concentrically, and wherein said contact arms of said contact bridge assigned to said contact plates forming said tracks are arranged so as to be offset by an angle providing a concise connection between said contact plates located on different tracks and said capacitor assigned to said contact plates.

References Cited

UNITED STATES PATENTS

| | | | |
|---|---|---|---|
| 1,350,279 | 8/1920 | Howe | 323—93 X |
| 1,396,030 | 11/1921 | Dubilier | 317—249 |
| 1,491,341 | 4/1924 | Eaves | 317—249 |
| 2,954,518 | 9/1960 | Dugot | 323—74 |
| 3,063,354 | 11/1962 | Matulik et al. | |

J D MILLER, Primary Examiner

G. GOLDBERG, Assistant Examiner

U.S. Cl. X.R.

95—10; 317—249; 323—93